H. EBERT.
SHUTTER BOWER AND FASTENER.
APPLICATION FILED MAR. 28, 1912.
1,052,227.
Patented Feb. 4, 1913.
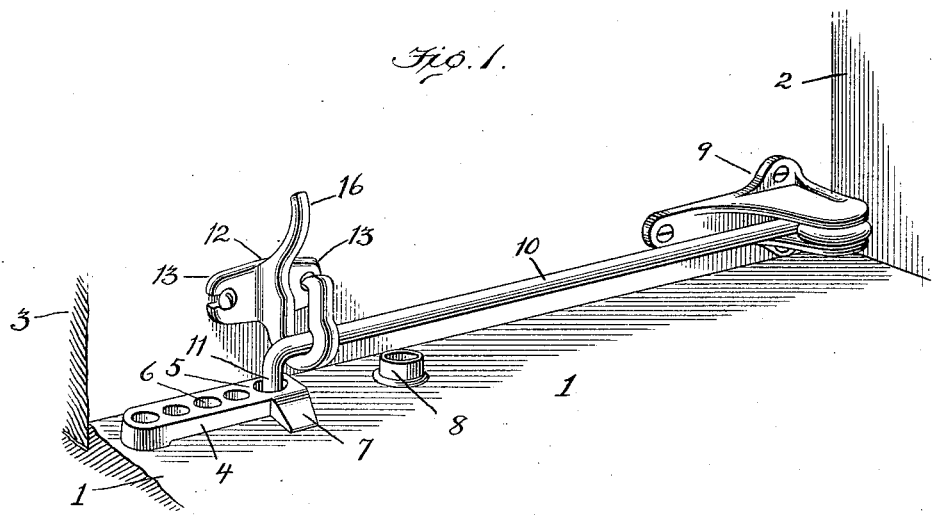
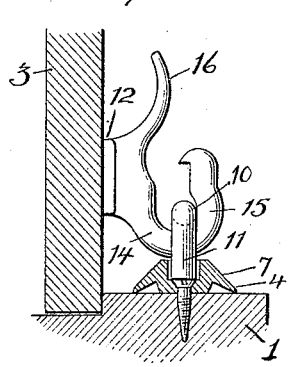 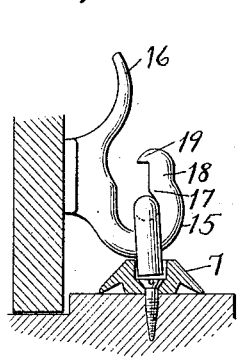 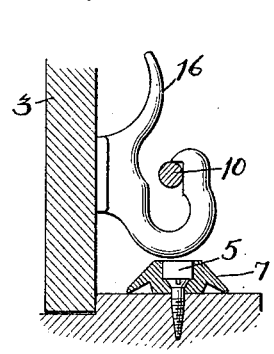
Witnesses
Edwin L. Bradford
G. Ferd. Vogt
Inventor
Harry Ebert
By Mann & Co
Attorneys

UNITED STATES PATENT OFFICE.

HARRY EBERT, OF FREDERICK, MARYLAND, ASSIGNOR TO THE AMERICAN FOUNDRY AND MANUFACTURING COMPANY, OF FREDERICK COUNTY, MARYLAND, A CORPORATION OF MARYLAND.

SHUTTER BOWER AND FASTENER.

1,052,227. Specification of Letters Patent. Patented Feb. 4, 1913.

Application filed March 28, 1912. Serial No. 686,733.

*To all whom it may concern:*

Be it known that I, HARRY EBERT, a citizen of the United States, residing at Frederick, in the county of Frederick and State of Maryland, have invented certain new and useful Improvements in Shutter Bowers and Fasteners, of which the following is a specification.

This invention relates to shutter bowers and fasteners of that type which comprise a locking and bowing rod, and a locking bracket both of which are suitably attached to the swinging shutter, and a locking and bowing metal socket immovably secured on the window sill. In this type of shutter bower and fastener it has been usual, when the carpenter attaches the several parts to the shutter and window sill, to place said parts in such relative position as will allow for a certain limited amount of movement or play both of the fastener parts and to the shutter when closed, in order that at the moment of closing the shutter the parts of the fastening device will readily engage each other. It would be somewhat difficult to effect any engagement of these locking parts if they were all so relatively positioned and attached as to cause a perfectly tight fit of the closed shutter.

While the slight looseness or limited movement of the closed shutter just described is a practical necessity, this looseness has the serious objection that a person on the outside of such closed shutter may unfasten the device and open the shutter by giving the shutter a sudden blow in the inward direction with one hand, and simultaneously applying an outward pull or pressure to the shutter with the other hand. The ordinary effect of the sudden blow on the slightly loose shutter is to cause the downwardly directed end of the locking and bowing rod to bounce upward and out of the sill-socket, and the locking parts being thus disengaged the simultaneous outward pull on the shutter will cause the latter to open.

An object of the present invention therefore is to overcome this objection, and to provide means that will prevent the downwardly directed end of the loosely held locking rod disengaging from the sill-socket when a concussion is caused by a blow made on the outside against the shutter.

A further object of this invention is to provide means that will make certain that the shutter will be fastened when slammed closed from the outside, as, when slammed the shutter coming in contact with the sub-sill of the window produces a sudden jar that will cause the free end of the locking rod to rise and fly out of the socket plate, rendering it difficult for the shutter to be locked in this manner.

The invention is illustrated in the accompanying drawing, in which,

Figure 1 shows a view in perspective of a portion of the window-sill and frame, and the shutter in closed position, and the several parts of the shutter-bower and fastener applied thereto. Figs. 2, 3 and 4 show vertical cross-sections of the window-sill and shutter, and illustrate different relative positions of the locking rod when the latter is in the open loop, 15, of the locking bracket.

Referring to the drawing, the numeral, 1, designates the sill of the window, 2, the window-frame, and, 3, the shutter hinged as usual to the window frame so as to swing toward or to open from the sill in the customary manner. A socket plate, 4, is attached to the sill, 1, in any well known manner and said plate is provided at one end with a locking socket, 5, and a plurality of bowing holes or sockets, 6, extend in a line beyond the said locking socket. The sill plate, 4, is also provided at one or both sides of the locking socket, 5, with an inclined wall or walls, 7. The sill-plate may vary in construction both as to the number of holes or openings, as well as to the location of the incline wall with respect to said openings; sill plates of this character are well known in the art. A separate socket plate, 8, may also be secured to the window sill, if desired, for a well known purpose presently to be mentioned.

A suitable bracket, 9, is attached near the hinged edge of the shutter and to this bracket one end of a locking and bowing rod, 10, is jointed so as to permit the rod to swing, and the other or free end of said rod is provided with a downturned hook, or prong, 11.

Near the outer or free edge of the swinging shutter, 3, is secured a locking bracket which comprises a base, 12, having laterally-projecting side flanges, 13, through which screws pass to secure it to the inner side of the shutter. A down-curved supporting arm, 14, is formed integrally with the base, 12, of this locking bracket and said supporting arm has a central vertical position between the two side flanges, 13, of the bracket. This arm, 14, extends from the base downwardly and then curves and projects upwardly so as to form a loop, 15, with its end pointing upwardly. One purpose of this loop is to provide a support upon which the locking rod, 10, may loosely rest with its end or prong, 11, pointing downward. A pulling hook or prong, 16, is also formed integrally with the base, 12, of the bracket and this pulling hook extends upwardly from the base.

In a general way the parts thus far described are old and well known, and my present invention is an improvement on these parts; by means of my improvements the rod, 10, will be loosely held in the vertical loop, but the down-turned end, 11, will not disengage from the sill-socket, 5, when a person on the outside applies a sudden blow against the shutter. These improvements will now be described.

The inner surface of the loop, 15, as seen in Figs. 2, 3 and 4, describes a curve which terminates on the inner side of the upwardly-curved end in an inverted shoulder, 17, and from said shoulder the end projects straight upward, as at 18, and at its top this end has a laterally-projecting lip, 19. In Fig. 2 of the drawing the down-pointed end, 11, of the locking rod is shown projecting vertically down into the locking socket, 5; this is the normal position of said end, 11, when the shutter is in a state of rest or when it is not under a strain due to a person trying to force it open. Fig. 3 shows the said end, 11, engaged with the socket, 5, but it will be seen on close inspection that the said down-pointed end is slightly inclined instead of being vertical, as in Fig. 2, and also that it is raised a little, and by being raised the horizontal or rod part, 10, has been brought in contact with the inverted shoulder, 17, which is one feature of this invention. This Fig. 3 illustrates how the said inverted shoulder prevents the hook, 11, of the locking rod disengaging from the sill-socket when a blow has been made on the exterior of the shutter and simultaneous with such blow a pull is also made to open the shutter. Fig. 4 shows that the down-pointed end, 11, has been removed in the drawing merely for the purpose of more clearly illustrating how the rod part, 10, rises or flies up and engages with the laterally-projecting lip, 19, when the shutter has been closed by a person on the outside slamming it hard. Were it not for the said improved lip, 19, at the extreme top of the upwardly-curved loop, 15, the said slam would cause the locking rod, 10, to suddenly rise or fly up high enough to disengage from the socket hole, 5, in the sill-plate, and also to entirely disengage from the said loop, 15.

Having thus described my invention what I claim and desire to secure by Letters Patent is—

1. The combination with a hinged window-shutter of a socket-plate, 4, attached to the window sill; a locking rod pivotally supported at one end on the window-shutter and its free end provided with a downward-projecting prong adapted to engage the said socket-plate; a locking bracket attached to the same shutter as the rod and having a vertical loop which loosely supports the locking rod—said loop being open at the top and at its lower part having a curve whose inner side near the opening is provided with an inverted shoulder, 17, to hold the locking rod in its seat.

2. In a window shutter bower and fastener, the combination of a socket-plate for attachment to a window sill; a locking and bowing rod for hinged attachment by one end to a hinged shutter and its free end adapted to engage the said socket-plate; and a locking bracket for rigid attachment to the same shutter to which the locking rod is hinged, said bracket having a vertical loop the lower part of which is curved and loosely supports the free end of said rod and the upper part of the loop above the curve having a straight vertically extending edge, the end having a laterally extending lip, 19, and forming a contracted opening.

In testimony whereof I affix my signature in presence of two witnesses.

HARRY EBERT.

Witnesses:
J. MARION STALEY,
M. M. EBERT.

Copies of this patent may be obtained for five cents each, by addressing the "Commissioner of Patents, Washington, D. C."